UNITED STATES PATENT OFFICE.

ALBERT COBENZL, OF HÖCHST-ON-THE-MAIN, GERMANY, ASSIGNOR TO THE FARBWERKE, VORMALS MEISTER, LUCIUS & BRÜNING, OF SAME PLACE.

GRAY DYE.

SPECIFICATION forming part of Letters Patent No. 454,535, dated June 23, 1891.

Application filed August 4, 1890. Serial No. 360,984. (No specimens.)

*To all whom it may concern:*

Be it known that I, ALBERT COBENZL, a citizen of the Empire of Austria-Hungary, residing at Höchst-on-the-Main, in the Empire of Germany, have invented certain new and useful Improvements in the Production of Gray Coloring-Matter; and I do hereby declare the following to be a full, clear, and exact description of the invention, such as will enable others skilled in the art to which it appertains to make and use the same.

I have discovered that by the action of hydrochlorate of nitroso-diethylaniline upon the beta-naphtholsulphonic acid of Schäffer there can be produced gray acid coloring-matter by strictly following the conditions hereinafter set forth.

It is essential that the action of free inorganic acids be excluded. If, for example, more zinc chloride should be used than is hereinafter prescribed, the resulting bodies will be more basic than acid, and they will certainly have the properties of coloring-matters, but in acid solutions. The salts of these bodies formed with acids dissolve in water with blue-gray coloration.

In carrying out my invention I proceed as set forth in the following examples:

1. One molecule of hydrochlorate of nitroso-diethylaniline and one molecule of the beta-naphtholmonosulphonate of sodium of Schäffer are heated on a water bath with from four to five times their weight of glacial acetic acid. After some time the melt assumes a vivid bluish-red color. When the reaction is finished, the whole is left to cool, rendered alkaline by the addition of some alkali and filtered off from the precipitate, which is the sodium salt of the new sulphonic acid. By dissolving it in a large quantity of hot water, filtering, in order to separate it from a small quantity of resin, and precipitating from the filtrate by means of common salt the sodium salt is obtained in a state pure enough for dyeing purposes.

2. One molecule of hydrochlorate of nitroso-diethylaniline and one molecule of the beta-naphtholmonosulphonic acid of Schäffer are dissolved in from five to six times their weight of alcohol and heated on a water bath until the mass assumes a pure bluish-red coloration. The alcohol is then distilled off, the residue is rendered alkaline and heated further, as set forth in example 1.

3. One molecule of nitroso-diethylaniline, one molecule of the beta-naphtholmonosulphonate of sodium of Schäffer and one molecule of zinc chloride diluted with a hundredfold the quantity of water are kept at from 70° to 80° centigrade until the whole of the nitroso body disappears and the solution takes a pure bluish-red coloration. It is then left to cool and the sulphonic acid formed precipitated by means of common salt. It is then filtered, the residue is dissolved in diluted soda solution, filtered, and precipitated by means of sulphuric acid. The precipitated sulphonic acid is collected and converted into the sodium salt.

The coloring-matter is principally suited for printing and dyeing woolen fabrics in blue-gray shades, excels in giving shades of great uniformity, and has great resistance to the influence of light.

The coloring-matter is a black amorphous powder very readily soluble in water with violet coloration, insoluble in acetone, benzene ($C_6H_6$,) and similar solvents, an addition of acid to the hot diluted aqueous solution turning the color of the solution into blue-green, and in concentrated solutions forming a green-blue precipitate of the free sulphonic acid, this acid being very difficultly soluble in water, a little more soluble in alcohol with blue-green coloration, and in concentrated sulphuric or hydrochloric acid dissolving with yellow-brown coloration, an addition of water to the solution in concentrated sulphuric acid producing a gray-blue precipitate and a solution of the same color, the coloring-matter insoluble in alkalis, an addition of zinc powder discoloring the ammoniacal solution of the coloring-matter, the filtered colorless solution exposed to the air rapidly reassuming the violet coloration, this violet solution acidulated turning into green and forming a green-blue precipitate, the acid solution reduced by zinc powder exposed to the air reassuming its original blue coloration, but slowly and imperfectly.

What I claim as my invention is—

As a new article, gray coloring-matter derived from nitroso-diethylaniline and the beta-naphtholmonosulphonic acid of Schäffer, a black amorphous powder readily soluble in water with violet coloration, insoluble in acetone, benzene, ($C_6H_6$,) and alkaline solutions, an addition of acid to the hot diluted aqueous solution turning the color of the solution into blue-green and in concentrated solutions forming a green-blue precipitate, the filtered colorless solution exposed to the air rapidly reassuming the violet coloration, this violet solution acidulated turning into green and forming a green-blue precipitate.

In testimony whereof I affix my signature in presence of two witnesses.

ALBERT COBENZL.

Witnesses:
   JOSEF REVERDY,
   HEINRICH HAHN.